United States Patent
Moussa

(10) Patent No.: US 12,420,476 B2
(45) Date of Patent: Sep. 23, 2025

(54) ADDITIVES FOR BUILD MATERIALS AND ASSOCIATED PRINTED 3D ARTICLES

(71) Applicant: 3D Systems, Inc., Rock Hill, SC (US)

(72) Inventor: Khalil Moussa, Chapel Hill, NC (US)

(73) Assignee: 3D Systems, Inc., Rock Hill, SC (US)

(*) Notice: Subject to any disclaimer, the term of this patent is extended or adjusted under 35 U.S.C. 154(b) by 266 days.

(21) Appl. No.: 18/180,316

(22) Filed: Mar. 8, 2023

(65) Prior Publication Data

US 2023/0249396 A1 Aug. 10, 2023

Related U.S. Application Data

(63) Continuation-in-part of application No. 17/737,355, filed on May 5, 2022, now Pat. No. 11,890,806.

(60) Provisional application No. 63/185,763, filed on May 7, 2021.

(51) Int. Cl.
- *B33Y 70/00* (2020.01)
- *B29C 64/124* (2017.01)
- *B33Y 10/00* (2015.01)
- *C08L 75/14* (2006.01)
- *B29K 75/00* (2006.01)

(52) U.S. Cl.
CPC .......... *B29C 64/124* (2017.08); *B33Y 10/00* (2014.12); *B33Y 70/00* (2014.12); *C08L 75/14* (2013.01); *B29K 2075/00* (2013.01)

(58) Field of Classification Search
None
See application file for complete search history.

(56) References Cited

U.S. PATENT DOCUMENTS

| | | |
|---|---|---|
| 8,796,492 B2 | 8/2014 | Saito et al. |
| 8,876,513 B2 | 11/2014 | Lim et al. |
| 10,449,124 B2 | 10/2019 | Murata et al. |
| 10,492,888 B2 | 12/2019 | Chen et al. |
| 10,781,274 B2 | 9/2020 | Liska et al. |
| 10,788,753 B2 | 9/2020 | Cole |
| 11,142,660 B2 | 10/2021 | Xu et al. |
| 11,174,338 B2 | 11/2021 | Liska et al. |
| 11,318,667 B2 | 5/2022 | Mojdeh et al. |
| 11,339,095 B2 | 5/2022 | Mayr et al. |
| 11,370,928 B2 | 6/2022 | Moussa |
| 2016/0318250 A1 | 11/2016 | Moussa |
| 2017/0007359 A1 | 1/2017 | Kopelman et al. |
| 2018/0215933 A1* | 8/2018 | Xu ................. C09D 11/107 |
| 2019/0136079 A1 | 5/2019 | Moussa |
| 2019/0374309 A1 | 12/2019 | Parkar et al. |
| 2020/0113652 A1 | 4/2020 | Raby |
| 2020/0172748 A1* | 6/2020 | Moussa .............. B33Y 70/10 |
| 2020/0197138 A1 | 6/2020 | Parkar et al. |
| 2020/0316856 A1 | 10/2020 | Mojdeh et al. |
| 2021/0095059 A1 | 4/2021 | Khavari et al. |
| 2021/0095094 A1 | 4/2021 | Khavari et al. |
| 2021/0147672 A1 | 5/2021 | Cole et al. |
| 2021/0238328 A1 | 8/2021 | Wu et al. |
| 2021/0277152 A1 | 9/2021 | Carter et al. |
| 2021/0386522 A1 | 12/2021 | Chakraborty et al. |
| 2022/0002573 A1 | 1/2022 | Cole |
| 2022/0098350 A1 | 3/2022 | Cole et al. |
| 2022/0162362 A1 | 5/2022 | Dorfinger et al. |
| 2022/0185928 A1 | 6/2022 | Moussa |
| 2022/0289942 A1 | 9/2022 | Moussa |
| 2022/0289984 A1 | 9/2022 | Moussa |

FOREIGN PATENT DOCUMENTS

| | | |
|---|---|---|
| CN | 111716710 A | 9/2020 |
| CN | 111716711 A | 9/2020 |
| EP | 2418 751 A1 * | 2/2012 |
| EP | 2415751 A1 | 2/2012 |
| EP | 3564206 A1 | 11/2019 |
| JP | 6781098 B2 | 11/2020 |
| WO | 2010114077 A1 | 10/2010 |
| WO | 2012116047 A1 | 8/2012 |
| WO | 2014152531 A1 | 9/2014 |
| WO | 2021245803 A1 | 12/2021 |
| WO | 2022235893 A1 | 11/2022 |

OTHER PUBLICATIONS

International Search Report and Written Opinion of the International Searching Authority, mailed Aug. 12, 2022, for International Application No. PCT/US2022/027812.

Japanese Office Action, mailed Nov. 26, 2024, for Japanese Application No. 2023-563977.

International Search Report and Written Opinion of the International Searching Authority, mailed Sep. 28, 2023, for International Application No. PCT/US2023/014786.

* cited by examiner

*Primary Examiner* — Mohammad M Ameen
(74) *Attorney, Agent, or Firm* — Maynard Nexsen PC; John P. Zimmer

(57) ABSTRACT

Additives for three-dimensional build materials or inks are described herein which, in some embodiments, can impart one or more structural enhancements to articles printed from the build materials. In one aspect, a polymerizable liquid comprises at least one additive including a plurality of cyclopolymerizable functionalities separated by an aliphatic linker or alkylene oxide linker.

20 Claims, No Drawings

ADDITIVES FOR BUILD MATERIALS AND ASSOCIATED PRINTED 3D ARTICLES

CROSS REFERENCE TO RELATED APPLICATIONS

This application is a continuation-in-part of U.S. patent application Ser. No. 17/737,355, filed May 5, 2022, which claims priority pursuant to 35 U.S.C. § 119 to U.S. Provisional Patent Application No. 63/185,763, filed May 7, 2021, each of which is hereby incorporated by reference in its entirety.

FIELD

The present invention relates to additives for three-dimensional build materials and, in particular, to additives that can impart structural enhancements to articles printed from the build materials.

BACKGROUND 3D printers employ build materials, which are also known as inks, to form various 3D objects, articles, or parts in accordance with computer generated files. In some instances, the build material is solid at ambient temperatures and converts to liquid at elevated jetting temperatures. In other instances, the build material is liquid at ambient temperatures.

Build materials can comprise a variety of chemical species. Chemical species to include in a build material can be selected according to various considerations including, but not limited to, desired chemical and/or mechanical properties of the printed article and operating parameters of the 3D printing apparatus. For example, ultra-violet (UV) curable acrylate formulations generally can print parts with high resolution on DLP systems. However, in many cases, the resulting parts lack desirable mechanical properties and can be prone to fracture or other degradative pathways. Such degradative pathways compromise article performance, leading to premature failure.

SUMMARY

In view of the foregoing, additives for three-dimensional build materials or inks are described herein which, in some embodiments, can impart one or more structural enhancements to articles printed from the build materials. In one aspect, a polymerizable liquid comprises at least one additive including a plurality of cyclopolymerizable functionalities separated by an aliphatic linker or alkylene oxide linker, the cyclopolymerizable functionalities of the formula:

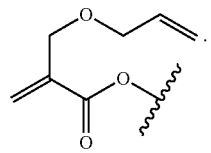 [SMILES: *OC(=O)C(=C)COCC=C]

When present, the alkylene oxide linker, in some embodiments, is oligomeric or polymeric.

In some embodiments, the polymerizable liquid further comprises an oligomeric curable material, monomeric curable material, or a mixture thereof. In some embodiments, the polymerizable liquid can comprise a photoinitiator component for initiating polymerization via one or more free radical mechanisms.

In another aspect, methods of printing three-dimensional articles are described herein. A method, in some embodiments, comprises providing a polymerizable liquid including an oligomeric curable material, monomeric curable material, or a mixture thereof, and at least one additive comprising a plurality of cyclopolymerizable functionalities separated by an aliphatic linker or alkylene oxide linker, the cyclopolymerizable functionalities of the formula:

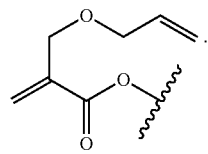 [SMILES: *OC(=O)C(=C)COCC=C]

The polymerizable liquid is printed and cured to form the article. In some embodiments, the article is formed via a layer-by-layer process, wherein layer formation is administered via deposition and curing of a layer of the polymerizable liquid. As described further herein, the polymerizable liquid may further comprise a photoinitiator component, and curing of the polymerizable liquid may occur by irradiation of the liquid with light of the appropriate wavelength to initial free radical polymerization.

These and other embodiments are further described in the following detailed description.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other additive manufacturing techniques now known in the art or that may be known in the future that use a build material or ink to fabricate three-dimensional objects.

In one aspect, a polymerizable liquid comprises at least one additive including a plurality of cyclopolymerizable functionalities separated by an aliphatic linker or alkylene oxide linker, the cyclopolymerizable functionalities of the formula:

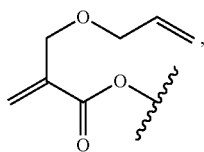 [SMILES: *OC(=O)C(=C)COCC=C]

where ⌇ is an attachment point of the cyclopolymerizable functionality to the linker. In some embodiments, the additive is of the formula:

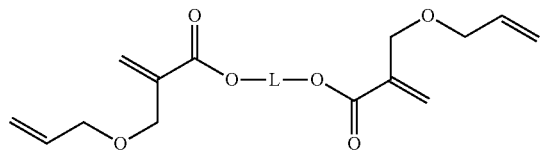

wherein L is the aliphatic or alkylene oxide linker. When present, the alkylene oxide linker can be oligomeric or polymeric, in some embodiments. In such embodiments, the additive can be of the formula:

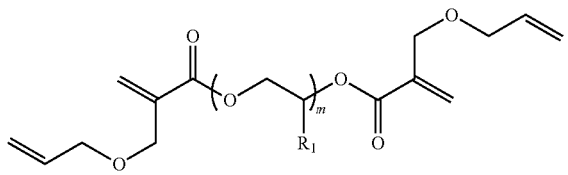

wherein $R^1$ is hydrogen or alkyl (e.g., C1-C10 alkyl, where a "Cn" alkyl is understood to include exactly "n" carbon atoms), and m is an integer from 1 to 20. In some embodiments, the additive comprises three or more cyclopolymerizable functionalities.

The additive can be present in the polymerizable liquid in any amount not inconsistent with the technical objective of improving or enhancing mechanical properties of three-dimensional articles printed from the polymerizable liquid. In some embodiments, the amount of additive is selected according to various considerations including, but not limited to, desired set of mechanical properties of an article printed from the polymerizable liquid, printing conditions, and/or chemical identity of other species in the polymerizable liquid. In some embodiments, one or more additives having a formula described herein are present in a polymerizable liquid in a total amount of 5 to 40 weight percent (wt. %), 5 to 30 wt. %, 7 to 30 wt. %, 10 to 30 wt. %, or 10 to 20 wt. %, based on total weight of the polymerizable liquid. It is of course further to be understood that the total weight of the polymerizable liquid is 100 wt. %.

The polymerizable liquid can further comprise an oligomeric curable material, monomeric curable material, or a mixture thereof. A curable material, for reference purposes herein, comprises a chemical species that includes one or more curable or polymerizable moieties. A "polymerizable moiety," for reference purposes herein, comprises a moiety that can be polymerized or cured to provide a printed 3D article or object. Such polymerizing or curing can be carried out in any manner not inconsistent with the objectives of the present disclosure. In some embodiments, for example, polymerizing or curing comprises irradiating a polymerizable or curable material with electromagnetic radiation having sufficient energy to initiate a polymerization or cross-linking reaction. For instance, in some cases, ultraviolet (UV) radiation can be used. Thus, in some instances, a polymerizable moiety comprises a photo-polymerizable or photo-curable moiety, such as a UV-polymerizable moiety. In some embodiments, a curable material described herein is photo-polymerizable or photo-curable at wavelengths ranging from about 300 nm to about 400 nm or from about 320 nm to about 380 nm. Alternatively, in other instances, a curable material is photo-polymerizable at visible wavelengths of the electromagnetic spectrum.

Moreover, a polymerization reaction, in some cases, comprises a free radical polymerization reaction, such as that between points of unsaturation, including points of ethyleneic unsaturation. Other polymerization reactions may also be used. As understood by one of ordinary skill in the art, a polymerization reaction employed to polymerize a curable material described herein can comprise a reaction of a plurality of "monomers" or chemical species having one or more functional groups or moieties that can react with one another to form one or more covalent bonds.

One non-limiting example of a polymerizable moiety of a curable material described herein is an ethyleneically unsaturated moiety, such as a vinyl moiety, allyl moiety, or (meth)acrylate moiety, where the term "(meth)acrylate" throughout this disclosure includes acrylate or methacrylate or a mixture or combination thereof.

Additionally, an oligomeric curable material and/or a monomeric curable material described herein can comprise a monofunctional, difunctional, trifunctional, tetrafunctional, pentafunctional, or higher functional curable species. A "monofunctional" curable species, for reference purposes herein, comprises a chemical species that includes one curable or polymerizable moiety. Similarly, a "difunctional" curable species comprises a chemical species that includes two curable or polymerizable moieties; a "trifunctional" curable species comprises a chemical species that includes three curable or polymerizable moieties; a "tetrafunctional" curable species comprises a chemical species that includes four curable or polymerizable moieties; and a "pentafunctional" curable species comprises a chemical species that includes five curable or polymerizable moieties. Thus, in some embodiments, a monofunctional curable material of a polymerizable liquid described herein comprises a mono (meth)acrylate, a difunctional curable material of a polymerizable liquid described herein comprises a di(meth)acrylate, a trifunctional curable material of a polymerizable liquid described herein comprises a tri(meth)acrylate, a tetrafunctional curable material of a polymerizable liquid described herein comprises a tetra(meth)acrylate, and a pentafunctional curable material of a polymerizable liquid described herein comprises a penta(meth)acrylate. Other monofunctional, difunctional, trifunctional, tetrafunctional, and pentafunctional curable materials may also be used.

Moreover, a monofunctional, difunctional, trifunctional, tetrafunctional, and pentafunctional curable material, in some cases, can comprise a relatively low molecular weight species, i.e., a monomeric species (such as a species having a molecular weight below 300, below 200, or below 100), or a relatively high molecular weight species, i.e., an oligomeric species (such as a species having a molecular weight (e.g., a weight average molecular weight in the case of a species having a molecular weight distribution) above 300, above 400, above 500, or above 600, and optionally below 10,000).

In general, any oligomeric curable material or combination of oligomeric curable materials not inconsistent with the objectives of the present disclosure may be used in an polymerizable liquid described herein. In some cases, an oligomeric curable material comprises a polyester acrylate oligomer, polyester (meth)acrylate oligomer, a urethane acrylate oligomer, a urethane (meth)acrylate oligomer, polyether urethane oligomer, or an epoxy(meth)acrylate oligomer. Further, in some embodiments, an oligomeric curable material described herein comprises an aliphatic polyester urethane acrylate oligomer and/or an acrylate amine oligomeric resin, such as EBECRYL 7100.

Some non-limiting examples of commercially available oligomeric curable materials useful in some embodiments described herein include the following: alkoxylated tetrahydrofurfuryl acrylate, commercially available from SARTOMER under the trade name SR 611; monofunctional urethane acrylate, commercially available from RAHN USA under the trade name GENOMER 1122; an aliphatic urethane diacrylate, commercially available from ALLNEX under the trade name EBECRYL 8402; a multifunctional acrylate oligomer, commercially available from DYMAX Corporation under the trade name BR-952; aliphatic polyether urethane acrylate, commercially available from DYMAX Corporation under the trade name BR-371 S, and polyether urethane methacrylate, commercially available from DYMAX Corporation under the trade name BR-541 MD. Other commercially available oligomeric curable materials may also be used.

Urethane (meth)acrylates suitable for use in polymerizable liquids described herein, in some cases, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers, in some cases, can be from about 500 to 6,000. Urethane (meth)acrylates are also commercially available from SARTOMER under the product names CN980, CN981, CN975 and CN2901. In some embodiments, urethane acrylate oligomers are employed in polymerizable liquids described herein. Suitable urethane acrylates can include difunctional aliphatic urethane acrylates from DYMAX Corporation under the trade designations BR-741 and BR-970. In some embodiments, oligomeric curable material comprises aliphatic polyester urethane acrylate or aliphatic polyeyether urethane acrylate. Commercial examples of these oligomeric species are available from DYMAX Corporation under the trade designations BR-7432 and BR-543, respectively.

The oligomeric curable material can be present in polymerizable liquids described herein in any desired amount. In some embodiments, the total amount of oligomeric curable material present is 5-50 wt. %, 5-40 wt. %, 5-35 wt. %, 5-30 wt. %, 10-50 wt. %, 10-40 wt. %, 10-35 wt. %, 10-30 wt. %, 15-50 wt. %, 15-40 wt. %, 15-35 wt. %, 15-30 wt. %, 20-50 wt. %, 20-40 wt. %, 20-35 wt. %, or 20-30 wt. %, based on total weight of the polymerizable liquid.

Polymerizable liquids described herein can include a monomeric curable material, in some embodiments. In some cases, a monomeric curable material of an polymerizable liquid described herein comprises one or more species of (meth)acrylates, such as one or more monofunctional, difunctional, trifunctional, tetrafunctional (meth)acrylates, and/or pentafunctional (meth)acrylates. In some embodiments, for instance, a monomeric curable material comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl (meth)acrylate, dicyclopentanyl methacrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or a combination thereof. In some embodiments, a monomeric curable material comprises one or more of allyl acrylate, allyl methacrylate, triethylene glycol di(meth)acrylate, tricyclodecane dimethanol diacrylate, and cyclohexane dimethanol diacrylate. Additionally, in some cases, a monomeric curable material comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, tripropylene glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, or bisphenol S. A monomeric curable material described herein may also comprise 1,1-trimethylolpropane tri(meth)acrylate, pentaerythritol monohydroxy tri(meth)acrylate, dipentaerythritol monohydroxy penta(meth)acrylate, bis(trimethylolpropane) tetra(meth)acrylate, and/or acryloyl morpholine.

Non-limiting examples of commercially available monomeric curable materials useful in some embodiments described herein include the following: isobornyl acrylate (IBOA), commercially available from SARTOMER under the trade name SR 506; isobornyl methacrylate, commercially available from SARTOMER under the trade name SR 423A; monofunctional acrylate monomer commercially available from SARTOMER under the trade name SR 420; cyclic trimethylolpropane formal acrylate monomer commercially available from SARTOMER under the trade name SR 531; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; 2-phenoxyethyl acrylate, commercially available from SARTOMER under the trade name SR 339; ethyoxylated (3 mole) bisphenol A diacrylate, commercially available from SARTOMER under the trade name SR 349; a cyclic monofunctional acrylate, commercially available by RAHN USA Corp. under the trade name GENOMER 1120; dipentaerythritol pentaacrylate, commercially available from SARTOMER under the trade name SR 399 LV; and dicyclopentanyl acrylate and/or dicyclopentanyl methacrylate, commercially available from Showa Denko Materials under the trade name FA-513 M. Other commercially available monomeric curable materials may also be used.

In some embodiments, the isocyanurate polyacrylate is of the formula:

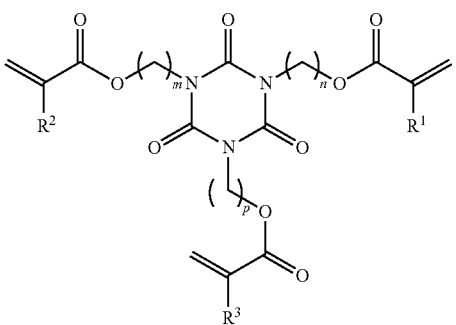

wherein $R^1$-$R^3$ are independently selected from the group consisting of hydrogen and alkyl (e.g., C1-C10 alkyl) and m, n, and p are integers independently ranging from 1 to 10.

In some embodiments, the monomeric curable material comprises a heterocycle comprising two or more unsaturated substituents. The substituted heterocycle, for example, can comprise three unsaturated substituents. The heterocycle can be polyallylated, in some embodiments. In being polyallylated, the heterocycle comprises two of more allyl substituents. For example, a polyallylated heterocycle can comprise a polyallyl isocyanurate. Alternatively, a heterocycle comprising two or more unsaturated substituents can be of the formula:

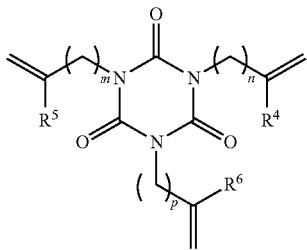

wherein $R^4$-$R^6$ are independently selected from the group consisting of hydrogen and alkyl (e.g., C1-C10 alkyl) and m, n, and p are integers independently ranging from 1 to 10.

In some embodiments, the monomeric curable material comprises cyclocarbonate (meth)acrylate monomer. For example, the monomeric curable material can comprise cyclocarbonate (meth)acrylate monomer is of the formula:

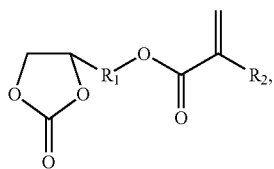

wherein $R_1$ is a linear or branched C1-C6 alkylene moiety; and wherein $R_2$ is H or $CH_3$.

The monomeric curable material can be present in polymerizable liquids described herein in any desired amount. In some embodiments, the monomeric curable material is present in an amount of 5-80 wt. %, 5-75 wt. %, 5-70 wt. %, 5-60 wt. %, 10-80 wt. %, 10-75 wt. %, 10-70 wt. %, 10-60 wt. %, 15-80 wt. %, 15-75 wt. %, 15-70 wt. %, 15-60 wt. %, 20-80 wt. %, 20-75 wt. %, 20-70 wt. %, 20-60 wt. %, 25-80 wt. %, 25-75 wt. %, 25-70 wt. %, 25-60 wt. %, 30-80 wt. %, 30-75 wt. %, 30-70 wt. %, 30-60 wt. %, 35-80 wt. %, 35-75 wt. %, 35-70 wt. %, or 35-60 wt. %, based on total weight of the polymerizable liquid. The monomeric curable material can comprise one species of monomer or a mixture of any species of monomer described above.

A polymerizable liquid, in some embodiments, comprises polymeric particles dispersed in the curable carrier. The polymeric particles can be of any composition and/or architecture not inconsistent with achieving the technical objectives described herein. The polymeric particles can comprise elastomer, thermoplastic, thermoset or any combination thereof. Specific compositional identity of the polymeric particles can be selected according to the desired mechanical properties of the printed article. In some embodiments, the polymeric particles exhibit a core-shell architecture. The polymeric particles, for example, can comprise an elastomeric core and thermoplastic or thermoset shell. In some embodiments, composite resins comprising core-shell particles in a curable resin are commercially available from Kaneka Texas Corporation under the Kane Ace® MX trade designation. The polymeric particles may have any desired size. In some embodiments, the polymeric particles have a size less than 1 µm. The polymeric particles, for example, may have an average size of 50 nm to 500 nm. In other embodiments, the polymeric particles can have an average size greater than 1 µm, such as 5 µm to 50 µm.

The polymeric particles can be present in the curable carrier in any desired amount. In some embodiments, the polymeric particles are present in an amount of 20-70 wt. % or 30-60 wt. % based on total weight of the composite resin. Moreover, the composite resin can be present in the polymerizable liquid in any amount not inconsistent with the technical objectives described herein. The composite resin, for example, can be present in an amount of at least 20 wt. % or at least 30 wt. % based on total weight of the polymerizable liquid. In some embodiments, the composite resin is present in an amount of 5-30 wt. % based on total weight of the polymerizable liquid.

A polymerizable liquid described herein, can further comprise a photoinitiator component for initiating polymerization of one or more components of the liquid upon exposure to light of the proper wavelength. In some embodiments, the photoinitiator component can initiate polymerization of an additive described herein comprising one or more points of unsaturation polymerizable via free radical mechanisms. Similarly, a photoinitiator can be employed to polymerize a (meth)acrylate component. In some embodiments, an additive described herein can be copolymerized with a (meth)acrylate component. In other embodiments, an additive and (meth)acrylate component are polymerized independently.

Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 420 nm or between about 300 nm and about 385 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Suitable photoinitiators can also comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, polymerizable liquids containing ionic dye-counter ion compounds can be polymerized upon exposure to visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in a polymerizable liquid described herein in any amount not inconsistent with the objectives of the present disclosure. In some embodiments, a photoinitiator is present in an amount of up to about 5 wt. %, based on the total weight of the polymerizable liquid. In some cases, a photoinitiator is present in an amount ranging from about 0.1 wt. % to about 5 wt. %.

Moreover, in some embodiments, a polymerizable liquid described herein can further comprise one or more sensitizers. A sensitizer can be added to increase the effectiveness of one or more photoinitiators that may also be present. Any sensitizer not inconsistent with the objectives of the present disclosure may be used. In some cases, a sensitizer comprises isopropylthioxanthone (ITX) or 2-chlorothioxanthone (CTX).

A sensitizer can be present in the polymerizable liquid in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the polymerizable liquid.

In some embodiments, one or more UV-absorbers and/or light stabilizers can be present in the polymerizable liquid. In some embodiments, for example, one or more UV-absorbers and/or light stabilizers can be present in an amount of 0.1-2 wt. %, based on the total weight of the polymerizable liquid. In some embodiments, UV-absorbers and/or light stabilizers are commercially available from BASF of Florham Park, New Jersey under the TINUVIN® trade-designation.

Additionally, methods of printing three-dimensional articles are described herein. A method, in some embodiments, comprises providing a polymerizable liquid including an oligomeric curable material, monomeric curable material, or a mixture thereof, and at least one additive comprising a plurality of cyclopolymerizable functionalities separated by an aliphatic linker or alkylene oxide linker, the cyclopolymerizable functionalities of the formula:

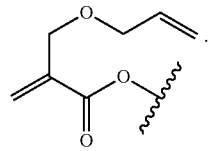 [SMILES: *OC(=O)C(=C)COCC=C]

The polymerizable liquid is printed and cured to form the article. In some embodiments, the article is formed via a layer-by-layer process, wherein layer formation is administered via deposition and curing of a layer of the polymerizable liquid. As described further herein, the polymerizable liquid may further comprise a photoinitiator component, and curing of the polymerizable liquid may occur by irradiation of the liquid with light of the appropriate wavelength to initial free radical polymerization.

In some embodiments, layers of polymerizable liquids can be deposited according to an image of the 3D article in a computer readable format during formation of the three-dimensional article. The polymerizable liquid can be deposited according to preselected computer aided design (CAD) parameters. Moreover, in some cases, one or more layers of the polymerizable liquid described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include so-called "multi-jet" or "stereolithography" 3D printing methods. For example, in some instances, a multi-jet method of printing a 3D article comprises selectively depositing layers of a polymerizable liquid described herein onto a substrate, such as a build pad of a 3D printing system. In addition, in some embodiments, a method described herein further comprises supporting at least one of the layers of the polymerizable liquid with a support material. Any support material not inconsistent with the objectives of the present disclosure may be used.

It is also possible to form a 3D article from a polymerizable liquid described herein using stereolithography. For example, in some cases, a method of printing a 3D article comprises retaining the polymerizable liquid in a container and selectively applying energy to the polymerizable liquid in the container to solidify at least a portion of a polymerizable liquid, thereby forming a solidified layer that defines a cross-section of the 3D article. Additionally, a method described herein can further comprise raising or lowering the solidified layer to provide a new or second layer of polymerizable liquid, followed by again selectively applying energy to the polymerizable liquid in the container to solidify at least a portion of the new or second polymerizable liquid that defines a second cross-section of the 3D article. Further, the first and second cross-sections of the 3D article can be bonded or adhered to one another in the z-direction (or build direction corresponding to the direction of raising or lowering recited above) by the application of the energy for solidifying the polymerizable liquid. Moreover, selectively applying energy to the polymerizable liquid in the container can comprise applying electromagnetic radiation, such as UV and/or visible radiation, having a sufficient energy to initiate polymerization of the polymerizable material as described herein. In addition, in some cases, raising or lowering a solidified layer of polymerizable liquid is carried out using an elevator platform disposed in the container of fluid build material. A method described herein can also comprise planarizing a new layer of polymerizable liquid provided by raising or lowering an elevator platform. Such planarization can be carried out, in some cases, by a wiper or roller.

Articles printed according to methods described herein can exhibit one or more desirable mechanical properties, due to the compositions and microstructures of the printed articles. 3D articles printed from polymerizable liquids described herein may also display a tensile modulus of 1900-2700 MPa. A 3D printed article, in some embodiments, can exhibit a tensile strength of greater than 40 MPa, such as a tensile strength of 40-70 MPa or 50-65 MPa. Values for tensile strength and tensile modulus provided herein can be determined according to ASTM D638.

Additionally, 3D articles printed from polymerizable liquids described herein can exhibit an elongation at break of at least 3%, at least 5% or at least 10% (e.g., when determined according to ASTM D638). In some embodiments, a printed 3D article has an elongation at break of greater than 10%, such as an elongation at break of 10-20%, when determined by ASTM D638. 3D articles printed from polymerizable liquids described herein can also exhibit a heat deflection temperature (HDT) of at least 90° C., such as 100-260° C. In some embodiments, a 3D article printed from polymerizable liquids described herein can have a HDT greater than 300° C. HDT is measured using DMA at 0.455 MPa according to ASTM D648.

Further, in some cases, 3D articles printed from polymerizable liquids described herein (and the polymerizable liquids themselves, upon polymerization) can have other desirable compositional parameters or features. For instance, in some implementations, a 3D article or polymerizable liquid described herein has a relatively high stress-relaxation value or residual stress (e.g., as measured in accordance with ASTM E837 or ASTM D638 Type IV). Moreover, in some embodiments, a 3D article or polymerizable liquid described herein has a relatively high stress-relaxation/residual stress value in water at 37° C. For instance, in some preferred embodiments, a 3D article or polymerizable liquid described herein has a stress-relaxation/residual stress value, or a stress relaxation remaining load (5% strain), in water at 37° C. of greater than 1 Newton (N), such as a value of 1-5 N, 1-3 N, 1-2 N, or 1-1.5 N, when measured in accordance with ASTM D638 Type IV.

Moreover, 3D articles printed from polymerizable liquids described herein (and the polymerizable liquids themselves, upon polymerization) can be resistant to hydrolysis or degradation due to water exposure. For example, in some cases a polymerizable liquid described herein (or a 3D article printed therefrom) can have a hydrolysis resistance with respect to maintenance of certain mechanical properties, such as flexural strength, flexural modulus, and/or elongation at break, after exposure to water. Thus, a 3D article or polymerizable liquid described herein can (due to its composition/microstructure) exhibit one, two, or all three of the following hydrolysis resistance metrics:

Flexural Strength (FS) Hydrolysis Resistance of at least 80%, at least 85%, at least 90%, or at least 95%;
Flexural Modulus (FM) Hydrolysis Resistance of at least 80%, at least 85%, at least 90%, or at least 95%; and
Elongation at Break (EOB) Hydrolysis Resistance of at least 80%, at least 85%, at least 90%, or at least 95%.

The above metrics are based on "water exposure" of a 3D article (or polymerized liquid) as follows. The relevant property (i.e., the flexural strength, flexural modulus, or elongation at break) of a test sample (e.g., the 3D article formed from the polymerizable liquid) is measured following printing of the 3D article (e.g., within 12 hours). The test sample is then immersed in water at 37° C. for 24 hours. Following this immersion period, the test sample is dried and the relevant property (i.e., the flexural strength, flexural modulus, or elongation at break) is measured again in the same manner as before (e.g., using ASTM D638, and providing an output in MPa). The post-immersion measurement is then compared to the pre-immersion measurement. For example, if a given test sample has a flexural strength of 100 MPa prior to water immersion, and a flexural strength of 95 MPa after water immersion for 24 hours, then the Flexural Strength Hydrolysis Resistance would be 95%, derived from comparing 95 MPa to 100 MPa.

Moreover, in some embodiments, it is even possible for water immersion to improve a specific property, such as the elongation at break. In some cases, for instance, a 3D article described herein has an EOB Hydrolysis Resistance of 80-130%, 80-125%, 90-125%, or 90-120%. The Flexural Strength Hydrolysis Resistance and/or the Flexural Modulus Hydrolysis Resistance may also, in some cases, be up to 110% or 105%, though it is to be understood that 100% is the typical maximum value.

Additionally, in some preferred embodiments, a 3D article printed from a polymerizable liquid described herein (and the polymerizable liquid itself, upon polymerization) has one, two, three, four, five, six, or all seven of the following compositional parameters:

(1) a stress-relaxation/residual stress value (or a stress relaxation remaining load, 5% strain) in water at 37° C. of greater than 1 N (e.g., 1-5 N, 1-3 N, 1-2 N, or 1-1.5 N), when measured in accordance with ASTM D638 Type IV;

(2) a stress relaxation starting load (5% strain) in water at 37° C. of less than 35 N or less than 30 N (e.g., 15-35 N or 20-35 N), when measured in accordance with ASTM D638 Type IV;

(3) a tensile strength of greater than 40 MPa (e.g., 40-70 MPa or 50-65 MPa), when measured in accordance with ASTM D638 Type IV;

(4) a flexural strength of greater than 35 MPa or greater than 40 MPa (e.g., 35-50 MPa or 40-50 MPa), when measured in accordance with ISO 20795-2;

(5) a flexural modulus of greater than 1000 MPa (e.g., 1000-2000 MPa or 1000-1500 MPa), when measured in accordance with ISO 20795-2;

(6) a Charpy Impact 1J value of greater than 5, greater than 8, or greater than 10 kJ/m$^3$ (e.g., 5-25 kJ/m$^3$, 5-20 kJ/m$^3$, 8-25 kJ/m$^3$, 8-20 kJ/m$^3$, 10-25 kJ/m$^3$, 10-20 kJ/m$^3$, or 15-25 kJ/m$^3$, when measured in accordance with ISO 179; and (7) an elongation at break of greater than 8% or greater than 10% (e.g., 10-20%), when measured in accordance with ISO 527 or ASTM D638 Type IV.

These and other embodiments are further illustrated in the following non-limiting examples.

EXAMPLES

Table 1 provides formulation of polymerizable liquids according to some embodiments described herein. The amounts listed in Table 1 (and other composition/formulation tables hereinbelow) are weight percents, based on the total weight of the polymerizable liquid. Dashes (-) denote the absence of a component in the case of a composition/formulation table, or the lack of a measured value in the case of a measured property table.

TABLE 1

| Component | Formula 1 | Formula 2 | Formula 3 | Formula 4 | Formula 5 |
|---|---|---|---|---|---|
| Polyether urethane methacrylate | 32 | 35 | 30 | 24 | 30 |
| Cyclopolymerizable Additive | 20 | 15 | 15 | 12 | 20 |
| Acryloyl morpholine | 15 | 25 | 30 | 24 | — |
| Vinyl methyl oxazolidinone | — | — | — | — | 26 |
| Isocyanurate acrylate | 18 | 20 | 20 | 16 | 20 |
| Dibromocrecyl diglycidyl ether | — | — | — | — | — |
| Cyclocarbonate methacrylate monomer | 10 | — | — | — | — |
| Core/Shell particle resin | — | — | — | 20 | — |
| Colorant | 0.5 | 0.5 | 0.5 | 0.4 | 0.5 |
| UV Absorber/Light Stabilizer | 1.2 | 1.2 | 1.2 | 0.96 | 1 |
| Photoinitiator | 2.8 | 2.8 | 2.8 | 2.24 | 2 |
| Dispersant | 0.5 | 0.5 | 0.5 | 0.4 | 0.5 |
| Antioxidant | — | — | — | — | — |

Table 2 provides physical properties of 3D articles printed using Formulas 1-5.

TABLE 2

| 3D Printed Article Properties | | | | | |
|---|---|---|---|---|---|
| | Formula 1 | Formula 2 | Formula 3 | Formula 4 | Formula 5 |
| Tensile strength (MPa) | 62 | 61 | 69 | 59 | 54 |
| Tensile modulus (MPa) | 2486 | 2404 | 2561 | 2383 | 2082 |
| Elongation (%) @ Break | 8.6 | 16.5 | 12.1 | 11.6 | 7.4 |
| Impact Strength (J/m) | 30.9 | 29.4 | 29.4 | 30.2 | 21.7 |
| HDT 0.455 MPa by DMA (C) | 99.7 | 96.2 | 104.8 | 96.7 | 109.4 |

Table 3 provides formulation of polymerizable liquids according to some embodiments described herein.

TABLE 3

| Component | Formula 6 | Formula 7 | Formula 8 | Formula 9 | Formula 10 |
|---|---|---|---|---|---|
| Polyether urethane methacrylate | 30 | 27 | 30 | 30 | 30 |
| Cyclopolymerizable Additive | 10 | 10 | 10 | 10 | 10 |
| Dicyclopentanyl methacrylate | — | — | — | 10 | 10 |
| Vinyl methyl oxazolidinone | 20 | 14 | — | — | — |
| Isocyanurate acrylate | 10 | 10 | 10 | 10 | 10 |
| Polyallyl isocyanurate | 25 | 20 | 46 | 36 | 36 |
| Cyclocarbonate methacrylate monomer | — | — | — | — | — |
| Core/Shell particle resin | — | 15 | — | — | — |
| Colorant | 0.5 | 0.5 | 0.5 | 0.5 | 0.5 |
| UV Absorber/Light Stabilizer | 1 | 1 | 1 | 1 | 1 |
| Photoinitiator | 2 | 2 | 2 | 2 | 2 |
| Dispersant | 0.5 | 0.5 | 0.5 | 0.5 | 0.5 |
| Antioxidant | 1 | — | — | — | — |

Table 4 provides physical properties of 3D articles printed using Formulas 6-10.

TABLE 4

3D Printed Article Properties

|  | Formula 6 | Formula 7 | Formula 8 | Formula 9 | Formula 10 |
|---|---|---|---|---|---|
| Tensile strength (MPa) | 51.2 | 50.5 | 52.5 | 55 | 48.1 |
| Tensile modulus (MPa) | 2030 | 1938 | 2366 | 2111 | 1912 |
| Elongation (%) @ Break | 5 | 6.4 | 3.4 | 7.8 | 3.9 |
| Impact Strength (J/m) | 14.4 | 19 | 12.1 | 12.9 | 9.3 |
| HDT 0.455 MPa by DMA (C) | 156 | 127 | — | 224.5 | 325 |

Table 5 provides formulations of polymerizable liquids according to some embodiments described herein.

TABLE 5

| Component | Formula 11 | Formula 12 |
|---|---|---|
| Polyether urethane methacrylate | 30 | 30 |
| Cyclopolymerizable Additive | 10 | 10 |
| Dicyclopentanyl methacrylate | — | 10 |
| Vinyl methyl oxazolidinone | — | — |
| Isocyanurate acrylate | 10 | 10 |
| Polyallyl isocyanurate | 46 | 36 |
| Cyclocarbonate methacrylate monomer | — | — |
| Core/Shell particle resin | — | — |
| Colorant | 0.1 | 0.1 |
| UV Absorber/Light Stabilizer | 1 | 1 |
| Photoinitiator | 2 | 2 |
| Dispersant | 0.9 | 0.9 |
| Antioxidant | — | — |

Table 6 provides physical properties of 3D articles printed using Formulas 11 and 12, including hydrolysis resistance properties when tested as described above.

TABLE 6

3D Printed Article Properties

|  | Formula 11 | Formula 12 |
|---|---|---|
| Flexural Strength (MPa) (pre-immersion) | 97 | 85 |
| Flexural Strength (MPa) (post-immersion) | 97 | 84 |
| FS Hydrolysis Resistance (%) | 100 | 99 |
| Flexural Modulus (MPa) (pre-immersion) | 2176 | 2004 |
| Flexural Modulus (MPa) (pre-immersion) | 2037 | 1771 |
| FM Hydrolysis Resistance (%) | 94 | 88 |
| Elongation @ Break (%) (pre-immersion) | 5.4 | 6.4 |
| Elongation @ Break (%) (post-immersion) | 6.6 | 8.1 |
| EOB Hydrolysis Resistance (%) | 120 | 127 |

Table 7 provides formulations of polymerizable liquids according to some embodiments described herein. In Table 7, the cyclopolymerizable additive had the formula of Embodiment 6 hereinbelow. Examples 14-16 are particularly preferred embodiments, and may be compared to non-preferred embodiment Example 13.

TABLE 7

| Component | Formula 13 | Formula 14 | Formula 15 | Formula 16 |
|---|---|---|---|---|
| Urethane acrylate oligomer | 30 | 24.5 | 25.4 | 24 |
| Cyclopolymerizable Additive | 20 | 19.5 | 20.3 | 19.2 |
| Tricyclodecane dimethanol diacrylate | — | 17.5 | 15.3 | 14.4 |
| Dicyclopentanyl methacrylate | 18 | 14.7 | 15.3 | 14.4 |
| Monofunctional monomeric acrylate | 30 | 21.8 | 21.7 | 26.1 |
| Photoinitiator | 2 | 2 | 2 | 1.9 |

Table 8 provides physical properties of 3D articles printed using Formulas 13-16. In Table 8, the stress relaxation values were measured using dog bone samples (L×W×H=50 mm×21 mm×0.76 mm), with a support span of 16 mm and a strain rate of 32 mm/min, in accordance with ASTM D638, Type IV. The values were measured after the samples were soaked at 37° C. for at least 12 hours. The flexural strain was determined as 6*D*H/L2, wherein L is the support span, H is the height or depth of the tested beam/sample, and D is the maximum deflection of the center of the tested beam/sample.

TABLE 8

3D Printed Article Properties

|  | Formula 13 | Formula 14 | Formula 15 | Formula 16 |
|---|---|---|---|---|
| Flexural modulus (MPa) (ISO 20795-2) | — | 1281 ± 87 | 1305 ± 53 | 1229 ± 57 |
| Flexural strength (MPa) (ISO 20795-2) | — | 42.8 ± 2.3 | 45.3 ± 0.6 | 40.5 ± 2.0 |
| Charpy impact 1 J (kJ/m$^3$) (ISO 179) | — | 5.4 ± 2.2 | 4.3 ± 2.3 | 6.2 ± 1.7 |
| Elastic modulus (MPa) (ISO 527) | 1345 ± 189 | 2202 ± 263 | 2252 ± 166 | 2213 ± 271 |
| Elongation@break (%) (ISO 527) | 36.34 ± 0.27 | 13.06 ± 3.63 | 8.32 ± 3.58 | 16.12 ± 6.12 |
| Stress relaxation starting load (5% strain) (N) | 16.04 | 26.14 | 24.01 | 21.41 |
| Stress relaxation remaining load (5% strain) (N) | 0 | 2.64 | 3.14 | 1.55 |

Table 9 provides formulations of polymerizable liquids according to some preferred embodiments described herein. In Table 9, the cyclopolymerizable additive had the formula of Embodiment 6 hereinbelow. Examples 17 and 18 are particularly preferred embodiments, and may be compared to non-preferred embodiment Example 19.

TABLE 9

| Component | Formula 17 | Formula 18 | Formula 19 |
|---|---|---|---|
| Urethane acrylate oligomer | 25 | 25 | 25 |
| Cyclopolymerizable Additive | 20 | 20 | 20 |
| Tricyclodecane dimethanol diacrylate | 5 | 10 | 15 |
| Dicyclopentanyl methacrylate | 18 | 18 | 18 |
| Monofunctional monomeric acrylate | 30 | 25 | 20 |
| Photoinitiator | 2 | 2 | 2 |

Table 10 provides physical properties of 3D articles printed using Formulas 17-19. In Table 10, the stress relaxation values were measured as described above for Table 8.

TABLE 10

3D Printed Article Properties

|  | Formula 17 | Formula 18 | Formula 19 |
|---|---|---|---|
| Flexural modulus (MPa) (ISO 20795-2) | 1166 ± 47 | 1256 ± 44 | 1276 ± 51 |
| Flexural strength (MPa) (ISO 20795-2) | 39.0 ± 0.6 | 45.9 ± 0.6 | 42.5 ± 2.1 |
| Charpy impact 1 J (kJ/m$^3$) (ISO 179) | 21.2 ± 8.0 | 14.9 ± 4.2 | 9.2 ± 4.4 |
| Elastic modulus (MPa) (ISO 527) | 2152 ± 571 | 2462 ± 252 | 2304 ± 167 |
| Elongation@break (%) (ISO 527) | 16.65 ± 5.12 | 10.92 ± 2.78 | 12.04 ± 0.61 |
| Stress relaxation starting load (5% strain) (N) | 28.31 | 30.75 | broke |
| Stress relaxation remaining load (5% strain) (N) | 1.22 | 4.0 | broke |

Table 11 provides formulations of polymerizable liquids according to some additional preferred embodiments described herein.

TABLE 11

| Component | Formula 20 | Formula 21 | Formula 22 |
|---|---|---|---|
| Urethane acrylate oligomer | 23.0 | 23.7 | 23.9 |
| Urethane acrylate monomer | 10.4 | 12.6 | 10.8 |
| Cyclopolymerizable Additive | 15.3 | 12.5 | 13.0 |
| Tricyclodecane dimethanol diacrylate | 21.9 | 21.9 | 18.6 |
| Dicyclopentanyl methacrylate | 13.4 | 13.4 | 17.1 |
| Monofunctional monomeric acrylate | 13.2 | 13.2 | 13.8 |
| Photoinitiator | 2 | 2 | 2.1 |
| Dye | 0.7 | 0.7 | 0.7 |

Table 12 provides physical properties of 3D articles printed using Formulas 20-22. In Table 12, the stress relaxation values were measured as described above for Table 8.

TABLE 12

| | 3D Printed Article Properties | | |
|---|---|---|---|
| | Formula 20 | Formula 21 | Formula 22 |
| Elongation@break (%) (ISO 527) | 9.84 | 11 | 11.4 |
| Stress relaxation remaining load (5% strain) (N) | 3.85 | 1.13 | 1.82 |

Some additional, non-limiting example embodiments are further described below.

Embodiment 1. A polymerizable liquid comprising:
at least one additive including a plurality of cyclopolymerizable functionalities separated by an aliphatic linker or alkylene oxide linker, the cyclopolymerizable functionalities of the formula:

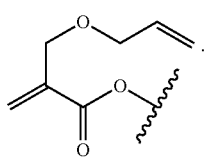 [SMILES: *OC(=O)C(=C)COCC=C]

Embodiment 2. The polymerizable liquid of Embodiment 1, wherein the additive is present in an amount of 5-40 wt. % based on total weight of the polymerizable liquid.

Embodiment 3. The polymerizable liquid of Embodiment 1, wherein the additive is present in an amount of 5-30 wt. %, 7-30 wt. %, or 10-30 wt. %, or 10-20 wt. %, based on total weight of the polymerizable liquid.

Embodiment 4. The polymerizable liquid of any of the preceding Embodiments, wherein the alkylene oxide linker is oligomeric or polymeric.

Embodiment 5. The polymerizable liquid of any of the preceding Embodiments, wherein the additive is of the formula:

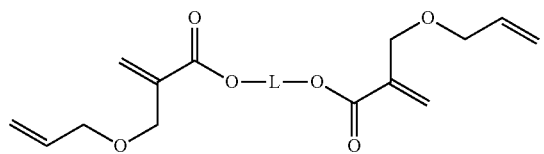

wherein L is the aliphatic or alkylene oxide linker.

Embodiment 6. The polymerizable liquid of any of the preceding Embodiments, wherein the additive is of the formula:

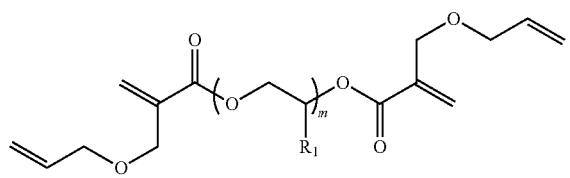

wherein $R^1$ is hydrogen or alkyl, and m is an integer from 1 to 20.

Embodiment 7. The polymerizable liquid of any of the preceding Embodiments further comprising an oligomeric curable material, monomeric curable material or a mixture thereof.

Embodiment 8. The polymerizable liquid of Embodiment 7 comprising the oligomeric curable material in an amount of 5-50 wt. % based on total weight of the polymerizable liquid.

Embodiment 9. The polymerizable liquid of Embodiment 7 comprising the monomeric curable material in an amount of 10-70 wt. % based on total weight of the polymerizable liquid.

Embodiment 10. The polymerizable liquid of Embodiment 7 comprising the oligomeric curable material in an amount of 5-50 wt. % based on total weight of the polymerizable liquid, and the monomeric curable material in an amount of 10-70 wt. % based on total weight of the polymerizable liquid.

Embodiment 11. The polymerizable liquid of any of Embodiments 7-10, wherein the oligomeric curable material comprises acrylate oligomer, methacrylate oligomer, or mixtures thereof.

Embodiment 12. The polymerizable liquid of any of Embodiments 7-11, wherein the monomeric curable material comprises acrylate monomer, methacrylate monomer, or mixtures thereof.

Embodiment 13. The polymerizable liquid of Embodiment 12, wherein acrylate monomer comprises cyclocarbonate (meth)acrylate monomer.

Embodiment 14. The polymerizable liquid of Embodiment 13, wherein the cyclocarbonate (meth)acrylate monomer is of the formula:

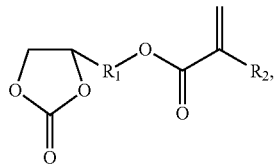

wherein $R^1$ is a linear or branched C1-C6 alkylene moiety; and
wherein $R^2$ is H or $CH_3$.

Embodiment 15. A method of printing a three-dimensional article comprising:
providing a polymerizable liquid according to any of Embodiments 1-14; and printing and curing the polymerizable liquid with light to form the article.

Embodiment 16. A polymerizable liquid comprising:
15-35 wt. % oligomeric curable material;
35-75 wt. % monomeric curable material; and
10-20 wt. % additive including a plurality of cyclopolymerizable functionalities separated by an aliphatic linker or alkylene oxide linker, wherein the cyclopolymerizable functionalities are of the formula:

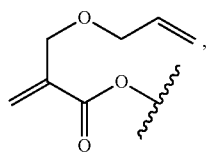 [SMILES: *OC(=O)C(=C)COCC=C]

wherein ∿∿∿ is an attachment point of the cyclopolymerizable functionality to the linker, and
wherein the polymerizable liquid, when cured, has a stress-relaxation/residual stress value in water at 37° C. of greater than 1 N when measured in accordance with ASTM D638 Type IV and, optionally, wherein the polymerizable liquid, when cured exhibits 1, 2, 3, 4, 5, or 6 additional structural features of the numbered list (1)-(7) described in hereinabove, immediately preceding the EXAMPLES section.

Embodiment 17. The polymerizable liquid of Embodiment 16, wherein the oligomeric curable material comprises one or more urethane (meth)acrylate oligomers.

Embodiment 18. The polymerizable liquid of Embodiment 16 or Embodiment 17, wherein the monomeric curable material comprises one or more (meth)acrylate species.

Embodiment 19. The polymerizable liquid of Embodiment 16 or Embodiment 17, wherein the monomeric curable material comprises at least one monofunctional (meth)acrylate and at least one multi-functional (meth)acrylate.

Embodiment 20. The polymerizable liquid of Embodiment 19, wherein the monomeric curable material comprises a monofunctional acrylate and a monofunctional methacrylate.

Embodiment 21. The polymerizable liquid of Embodiment 20, wherein: the monofunctional acrylate is present in the polymerizable liquid in an amount of 10-20 wt. % or 20-30 wt. %; and the monofunctional methacrylate is present in the polymerizable liquid in an amount of 10-20 wt. %, based on the total weight of the polymerizable liquid.

Embodiment 22. The polymerizable liquid of Embodiment 19, wherein: the multi-functional (meth)acrylate comprises a di(meth)acrylate; and the di(meth)acrylate is present in the polymerizable liquid in an amount of 5-25 wt. %, based on the total weight of the polymerizable liquid.

Embodiment 23. The polymerizable liquid of any one of Embodiments 16-22, wherein:

the oligomeric curable material comprises one or more urethane (meth)acrylate oligomers;

the monomeric curable material comprises a monofunctional acrylate, a monofunctional methacrylate, and a di(meth)acrylate and, optionally, a urethane acrylate;

the monofunctional acrylate is present in the polymerizable liquid in an amount of 10-20 wt. % or 20-30 wt. %;

the monofunctional methacrylate is present in the polymerizable liquid in an amount of 10-20 wt. %, based on the total weight of the polymerizable liquid; and the di(meth)acrylate is present in the polymerizable liquid in an amount of 5-25 wt. %, based on the total weight of the polymerizable liquid.

Embodiment 24. The polymerizable liquid of Embodiment 23, wherein the additive is of the formula:

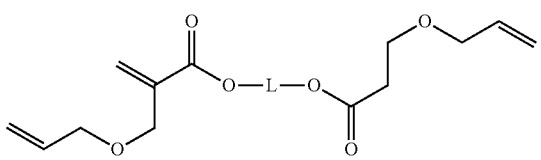

wherein L is the aliphatic or alkylene oxide linker.

Embodiment 25. The polymerizable liquid of Embodiment 24, wherein the additive is of the formula:

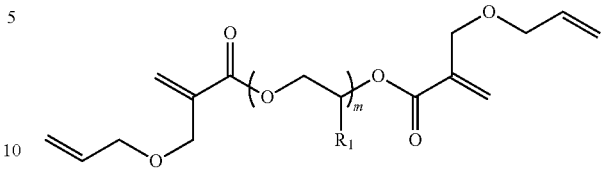

wherein $R^1$ is hydrogen or alkyl, and m is an integer from 1 to 20.

Embodiment 26. A method of printing a three-dimensional article comprising:

providing a polymerizable liquid according to any one of Embodiments 16-25; and printing and curing the polymerizable liquid with light to form the article, wherein the polymerizable liquid, when cured, has a stress-relaxation/residual stress value in water at 37° C. of greater than 1 N when measured in accordance with ASTM D638 Type IV.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A polymerizable liquid comprising:
   15-35 wt. % oligomeric curable material;
   35-75 wt. % monomeric curable material; and
   10-20 wt. % additive including a plurality of cyclopolymerizable functionalities separated by an aliphatic linker or alkylene oxide linker, wherein the cyclopolymerizable functionalities are of the formula:

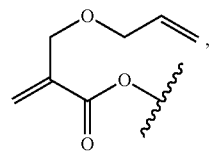

wherein ⌇ is an attachment point of the cyclopolymerizable functionality to the linker, and wherein the polymerizable liquid, when cured, has a stress-relaxation/residual stress value in water at 37° C. of greater than 1 N when measured in accordance with ASTM D638 Type IV.

2. The polymerizable liquid of claim 1, wherein the oligomeric curable material comprises one or more urethane (meth)acrylate oligomers.

3. The polymerizable liquid of claim 1, wherein the monomeric curable material comprises one or more (meth)acrylate species.

4. The polymerizable liquid of claim 1, wherein the monomeric curable material comprises at least one monofunctional (meth)acrylate and at least one multi-functional (meth)acrylate.

5. The polymerizable liquid of claim 4, wherein the monomeric curable material comprises a monofunctional acrylate and a monofunctional methacrylate.

6. The polymerizable liquid of claim 5, wherein:
the monofunctional acrylate is present in the polymerizable liquid in an amount of 20-30 wt. %; and
the monofunctional methacrylate is present in the polymerizable liquid in an amount of 10-20 wt. %, based on the total weight of the polymerizable liquid.

7. The polymerizable liquid of claim 4, wherein:
the multi-functional (meth)acrylate comprises a di(meth)acrylate; and
the di(meth)acrylate is present in the polymerizable liquid in an amount of 5-25 wt. %, based on the total weight of the polymerizable liquid.

8. The polymerizable liquid of claim 1, wherein:
the oligomeric curable material comprises one or more urethane (meth)acrylate oligomers;
the monomeric curable material comprises a monofunctional acrylate, a monofunctional methacrylate, and a di(meth)acrylate;
the monofunctional acrylate is present in the polymerizable liquid in an amount of 20-30 wt. %;
the monofunctional methacrylate is present in the polymerizable liquid in an amount of 10-20 wt. %, based on the total weight of the polymerizable liquid; and
the di(meth)acrylate is present in the polymerizable liquid in an amount of 5-25 wt. %, based on the total weight of the polymerizable liquid.

9. The polymerizable liquid of claim 8, wherein the additive is of the formula:

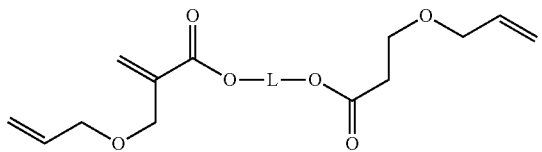

wherein L is the aliphatic or alkylene oxide linker.

10. The polymerizable liquid of claim 9, wherein the additive is of the formula:

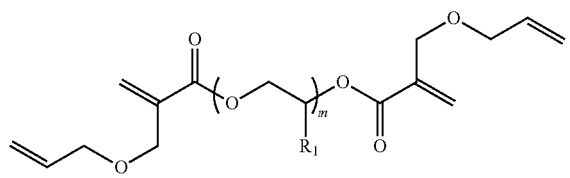

wherein $R^1$ is hydrogen or alkyl, and m is an integer from 1 to 20.

11. A method of printing a three-dimensional article comprising:
providing the polymerizable liquid of claim 1; and
printing and curing the polymerizable liquid with light to form the article.

12. The method of claim 11, wherein the oligomeric curable material comprises one or more urethane (meth)acrylate oligomers.

13. The method of claim 11, wherein the monomeric curable material comprises one or more (meth)acrylate species.

14. The method of claim 11, wherein the monomeric curable material comprises at least one monofunctional (meth)acrylate and at least one multi-functional (meth)acrylate.

15. The method of claim 14, wherein the monomeric curable material comprises a monofunctional acrylate and a monofunctional methacrylate.

16. The method of claim 15, wherein:
the monofunctional acrylate is present in the polymerizable liquid in an amount of 20-30 wt. %; and
the monofunctional methacrylate is present in the polymerizable liquid in an amount of 10-20 wt. %, based on the total weight of the polymerizable liquid.

17. The method of claim 14, wherein:
the multi-functional (meth)acrylate comprises a di(meth)acrylate; and
the di(meth)acrylate is present in the polymerizable liquid in an amount of 5-25 wt. %, based on the total weight of the polymerizable liquid.

18. The method of claim 11, wherein:
the oligomeric curable material comprises one or more urethane (meth)acrylate oligomers;
the monomeric curable material comprises a monofunctional acrylate, a monofunctional methacrylate, and a di(meth)acrylate;
the monofunctional acrylate is present in the polymerizable liquid in an amount of 20-30 wt. %;
the monofunctional methacrylate is present in the polymerizable liquid in an amount of 10-20 wt. %, based on the total weight of the polymerizable liquid; and
the di(meth)acrylate is present in the polymerizable liquid in an amount of 5-25 wt. %, based on the total weight of the polymerizable liquid.

19. The method of claim 18, wherein the additive is of the formula:

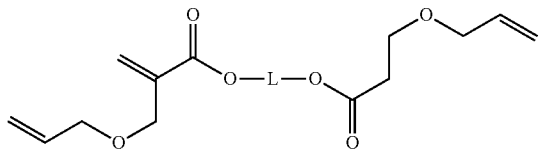

wherein L is the aliphatic or alkylene oxide linker.

20. The method of claim 19, wherein the additive is of the formula:

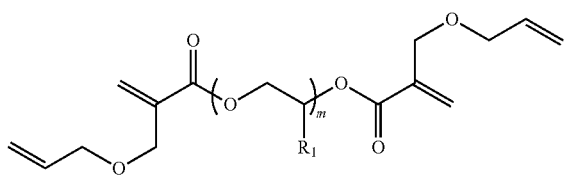

wherein $R^1$ is hydrogen or alkyl, and m is an integer from 1 to 20.

* * * * *